United States Patent
Park et al.

(10) Patent No.: US 7,934,811 B2
(45) Date of Patent: May 3, 2011

(54) INKJET PRINTHEAD HAVING CONDUCTIVE EPOXY RESIN

(75) Inventors: Byung-ha Park, Suwon-si (KR); Young-ung Ha, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1267 days.

(21) Appl. No.: 11/531,414

(22) Filed: Sep. 13, 2006

(65) Prior Publication Data

US 2007/0060675 A1    Mar. 15, 2007

(30) Foreign Application Priority Data

Sep. 13, 2005   (KR) .................. 10-2005-0085203

(51) Int. Cl.
*B41J 2/05* (2006.01)
*B41J 2/14* (2006.01)
*B41J 2/145* (2006.01)
*B41J 2/16* (2006.01)
*C08L 63/00* (2006.01)

(52) U.S. Cl. .............. 347/65; 347/20; 347/40; 347/46; 347/56; 347/63

(58) Field of Classification Search .............. 347/20, 347/40, 44, 47, 54, 56, 60, 61, 63, 64, 65
See application file for complete search history.

(56) References Cited

U.S. PATENT DOCUMENTS

| 2003/0170567 A1* | 9/2003 | Patil et al. .................. 430/280.1 |
| 2004/0179064 A1 | 9/2004 | Zapka et al. |
| 2007/0046730 A1* | 3/2007 | Min et al. ........................ 347/61 |

FOREIGN PATENT DOCUMENTS

| JP | 59-1526 | 1/1984 |
| JP | 2001-191532 | 7/2001 |
| JP | 2002-154210 | 5/2002 |

* cited by examiner

*Primary Examiner* — Michael J Feely
(74) *Attorney, Agent, or Firm* — Stanzione & Kim, LLP

(57) ABSTRACT

An inkjet printhead includes an ink flow path including a nozzle through which ink is ejected and is formed of a conductive epoxy resin, the conductive epoxy resin is a hardening result of a conductive cross-linked polymer resist composition formed by actinic radiation, and the conductive cross-linked polymer resist composition includes (a) at least one epoxy precursor polymer selected from a phenol novolak precursor polymer and an alicyclic precursor polymer including glycidyl ether group, (b) a metal alkoxide compound represented by the following formula R'M(OR)$_n$, where R' refers to a functional group including an oxirane group or an oxetanyl group, R refers to a $C_{1-10}$ alkyl group, and M is a metal selected from the group consisting of Al, Ti, and Zr, (c) a cationic photoinitiator, and (d) a solvent. The inkjet printhead includes an ink flow path formed of a conductive epoxy resin and a trench formed around a heater of the inkjet printhead to dissipate residual heat generated by the heater.

15 Claims, 2 Drawing Sheets

INKJET PRINTHEAD HAVING CONDUCTIVE EPOXY RESIN

CROSS-REFERENCE TO RELATED APPLICATIONS

This application claims priority under 35 U.S.C. §119(a) from Korean Patent Application No. 10-2005-0085203, filed on Sep. 13, 2005 in the Korean Intellectual Property Office, the disclosure of which is incorporated herein in its entirety by reference.

BACKGROUND OF THE INVENTION

1. Field of the Invention

The present general inventive concept relates to an inkjet printhead, and more particularly, to a thermal inkjet printhead in which residual heat generated from a heater is effectively dispersed, thereby enhancing an ink ejecting ability of the thermal inkjet printhead.

2. Description of the Related Art

Generally, an inkjet printhead ejects ink droplets on desired positions of a recording paper in order to print predetermined color images. Inkjet printers are classified into shuttle type inkjet printers having printheads that are shuttled in a direction perpendicular to a transporting direction of a print medium, and line printing type inkjet printers having a page-width array printhead corresponding to a width of a print medium. The line printing type inkjet printer has been developed for high-speed printing. The array printhead has a plurality of inkjet printheads arranged in a predetermined configuration. In the line printing type inkjet printer, during printing, the array printhead is fixed and a print medium is transported, thereby allowing high-speed printing.

Inkjet printheads are categorized into two types according to an ink droplet ejection mechanism thereof: a thermal inkjet printhead and a piezoelectric printhead. The thermal inkjet printhead ejects ink droplets due to an expansion force of ink bubbles generated by thermal energy. The piezoelectric inkjet printhead ejects ink droplets by pressure applied to ink due to a deformation of a piezoelectric body.

The ink droplet ejection mechanism of the thermal inkjet printhead is as follows. When current flows through a heater made of a heating resistor, the heater is heated and ink near the heater in an ink chamber is instantaneously heated up to about 300° C. Accordingly, ink bubbles are generated by ink evaporation, and the generated bubbles are expanded to exert a pressure on the ink filled in the ink chamber. Thereafter, ink droplets are ejected through a nozzle out of the ink chamber.

FIG. 1 is a schematic cross-sectional view illustrating a conventional thermal inkjet printhead. Referring to FIG. 1, the conventional inkjet printhead includes a substrate 10 on which a plurality of material layers are stacked, a chamber layer 20 that is stacked on the substrate 10 and defines an ink chamber 22, and a nozzle layer 30 stacked on the chamber layer 20. Ink is filled in the ink chamber 22 and a heater 14 to heat the ink to generate bubbles therein is installed under the ink chamber 22. In addition, the nozzle layer 30 has a nozzle 32 through which ink is ejected.

An insulation layer 12 for heat and electric insulation between the heater 14 and the substrate 10 is formed on the substrate 10. The heater 14 to heat the ink in the ink chamber 22 to generate bubbles therein is disposed on the insulation layer 12. Conductors 16 for supplying an electric current to the heater 14 are disposed on the heater 14. A passivation layer 18 is formed on the heater 14 and the conductors 16 to protect the heater 14 and the conductors 16.

However, in the above conventional structure, some of the heat generated from the heater 14 is used for ink ejection and the rest of the heat is dissipated to outside of the printhead mainly through ink, and thus an ink dissipation effect is degraded. When the heat generated from the heater 14 is accumulated around the ink chamber 22, a temperature of the ink filled in the ink chamber 22 increases, and thus a viscosity of the ink decreases, thereby degrading ink ejecting characteristics of the printhead, such as an ink ejection frequency and an ink ejection rate.

Recently, line printing type inkjet printers have been developed to satisfy demands of high integration and high speed. Since an array printhead used in a line printing type inkjet printer includes many heaters, a large amount of heat is generated from the heaters and remains inside the array inkjet printhead. Accordingly, if a conventional thermal inkjet printhead is employed in the array printhead, ink ejection characteristics thereof may deteriorate. To solve the above problems, the remaining heat generated from the heater (i.e., the heat other than the heat used for ink ejection) should be dissipated inside the printhead or through a heat sink.

SUMMARY OF THE INVENTION

The present general inventive concept provides a thermal inkjet printhead to enhance ink ejecting characteristics thereof by effectively dissipating residual heat generated by a heater.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an inkjet printhead, including an ink flow path including a nozzle through which ink is ejected and formed of a conductive epoxy resin, the conductive epoxy resin being a hardening result of a conductive cross-linked polymer resist composition formed by actinic radiation, and the conductive cross-linked polymer resist composition including at least one epoxy precursor polymer selected from a phenol novolak precursor polymer and an alicyclic precursor polymer comprising glycidyl ether group, a metal alkoxide compound represented by the following formula: $R'M(OR)_n$, in which $R'$ refers to a functional group comprising an oxirane group or an oxetanyl group, R refers to a $C_{1-10}$ alkyl group, and M is a metal selected from the group consisting of Al, Ti, and Zr, cationic photoinitiator, and a solvent.

The at least one epoxy precursor polymer may include a skeleton monomer selected from phenol, o-cresol, p-cresol, bisphenol-A, cycloaliphatic, and mixtures thereof.

The at least one epoxy precursor polymer may be at least one compound selected from:

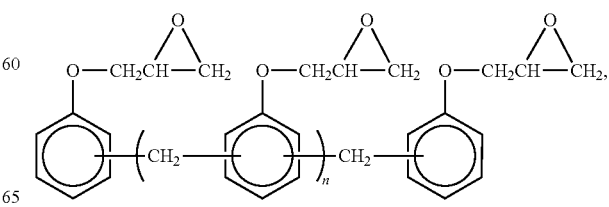

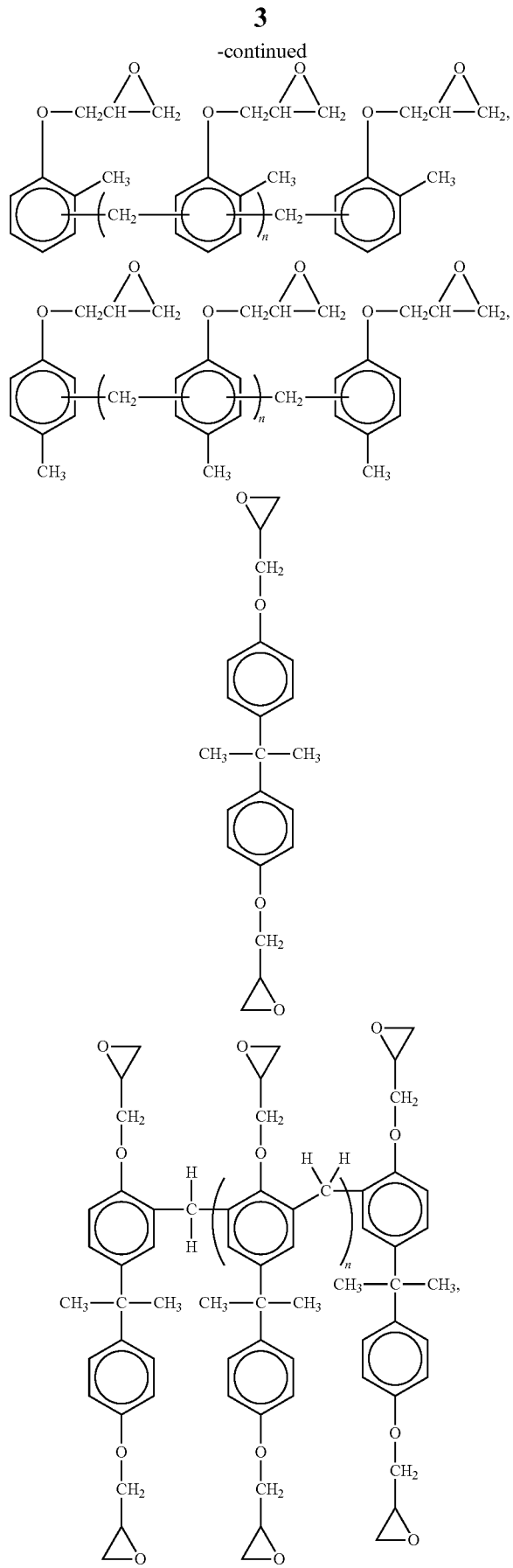

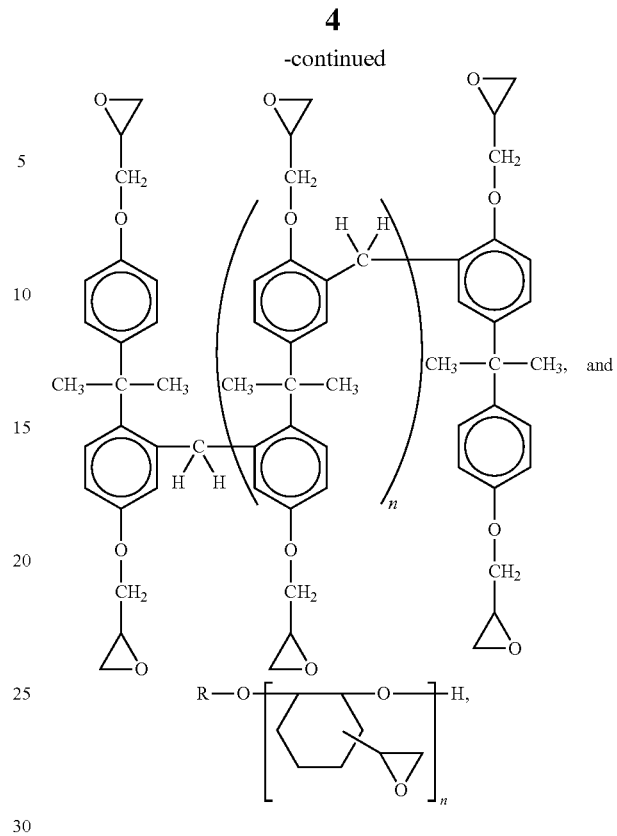

in which n is an integer from 1 to 20 and R refers to a $C_{1-10}$ alkyl group.

The cationic photoinitiator may be sulfonium salt or iodide.

The solvent may be selected from γ-butyrolactone, propylene glycol methyl ethyl acetate (PGMEA), tetrahydrofurane (THF), methyl ethyl ketone, methyl isobutyl ketone, cyclopentanone, and mixtures thereof.

The foregoing and/or other aspects and utilities of the present general inventive concept may also be achieved by providing a thermal inkjet printhead, including a heater formed on a substrate, an electrode formed to be electrically connected to the heater on the substrate and to apply current to the heater, a passivation layer stacked on the substrate where the heater and the electrode are formed to protect the heater and the electrode, a trench formed at a depth from a surface of the passivation layer to the substrate, and a conductive ink flow path stacked on the substrate where the passivation layer is formed to fill the trench to dissipate heat generated by the heater.

The foregoing and/or other aspects and utilities of the present general inventive concept may also be achieved by providing an inkjet printhead, including a heater formed on a substrate, an electrode formed to be electrically connected to the heater on the substrate and to apply current to the heater, a passivation layer stacked on the substrate where the heater and the electrode are formed to protect the heater and the electrode, a trench formed at a depth from a surface of the passivation layer to the substrate, and a conductive ink flow path stacked on the substrate where the passivation layer is formed to fill the trench to dissipate heat generated by the heater, the ink flow path includes a nozzle through which ink is ejected and is formed of a conductive epoxy resin that is a hardening result of a conductive cross-linked polymer resist composition formed by actinic radiation, and the conductive cross-linked polymer resist composition includes at least one epoxy precursor polymer selected from a phenol novolak precursor polymer and an alicyclic precursor polymer comprising glycidyl ether group, a metal alkoxide compound represented by the following formula R'M(OR)$_n$ in which R' refers to a functional group comprising an oxirane group or an oxetanyl group, R refers to a C$_{1-10}$ alkyl group, and M is a metal selected from the group consisting of Al, Ti, and Zr, a cationic photoinitiator, and a solvent.

The foregoing and/or other aspects and utilities of the present general inventive concept may also be achieved by providing an inkjet printhead, including a substrate including a heater, an ink flow path including a chamber layer stacked on the substrate and having an ink chamber surrounding the heater to contain ink, and a nozzle layer having a plurality of nozzles to eject ink from the ink chamber, and at least one of the chamber layer and the nozzle layer comprises a conductive epoxy resin including a metal to dissipate residual heat generated by the heater.

The conductive epoxy resin may be a hardening result of a conductive cross-linked polymer resist composition. The polymer resist composition may include at least one epoxy precursor polymer selected from a phenol novolak precursor polymer and an alicyclic precursor polymer including glycidyl ether group, a metal alkoxide compound having an epoxy ring group, a cationic photoinitiator, and a solvent.

The at least one epoxy precursor polymer may include a bifunctional ether functional group, and an amount of the at least one epoxy precursor polymer may be about 5 to about 50% by weight based on a total amount of the polymer resist composition. The at least one epoxy precursor polymer may include the bifunctional ether functional group, and the amount of the at least one epoxy precursor polymer may be about 10 to about 20% by weight based on a total amount of the polymer resist composition.

The at least one epoxy precursor polymer may include a polyfunctional ether functional group, and an amount of the at least one epoxy precursor polymer may be about 0.5 to about 20% by weight based on a total amount of the polymer resist composition. The at least one epoxy precursor polymer may include the polyfunctional ether functional group, and the amount of the at least one epoxy precursor polymer may be about 1 to about 5% by weight based on a total amount of the polymer resist composition.

The inkjet printhead may be a shuttle type inkjet printhead. The inkjet printhead may be an array type inkjet printhead. An amount of the solvent may be about 20 to about 90% by weight based on a total amount of the polymer resist composition. The amount of the solvent may be about 45 to about 75% by weight based on a total amount of the polymer resist composition.

The inkjet printhead may further include at least one member selected from the group consisting of a photo-sensitizer, a silane coupling agent, a filler, and a viscosity modifier. An amount of the photo-sensitizer may be about 0.1 to about 20% by weight based on a total weight of the polymer resist composition. The inkjet printhead may further include an insulating layer formed between the substrate and the heater, a conductor formed on the heater to provide current to the heater, a passivation layer formed on the conductor and the heater, and a trench formed through the insulating layer, the conductor, and the passivation layer, and the chamber layer may contact the substrate through the trench to dissipate residual heat generated by the heater towards the nozzle layer and/or towards the substrate.

The foregoing and/or other aspects and utilities of the present general inventive concept may also be achieved by providing a polymer resist composition, including at least one epoxy precursor polymer selected from a phenol novolak precursor polymer and an alicyclic precursor polymer including glycidyl ether group, a metal alkoxide compound having an epoxy ring group, a cationic photoinitiator, and a solvent.

The foregoing and/or other aspects and utilities of the present general inventive concept may also be achieved by providing a method of forming a conductive epoxy resin including a metal, including reacting metal alkoxide compounds, each including an ether group, with water to form metal hydroxyl compounds, each including an ether group, linking a plurality of the metal hydroxyl compounds to each other by ether bonding, and cross-linking the linked plurality of metal hydroxyl compounds in the presence of at least one epoxy precursor polymer, a photoinitiator, and actinic radiation to form the conductive epoxy resin including the metal. The metal of the conductive epoxy resin may be directly linked to a hydrogen atom and to a carbon atom of the conductive epoxy resin.

The foregoing and/or other aspects and utilities of the present general inventive concept may also be achieved by providing a method of manufacturing an inkjet printhead, the method including forming a chamber layer having an ink chamber to contain ink on a substrate including a heater, forming a nozzle layer having a plurality of nozzles to eject ink from the ink chamber, and at least one of the chamber layer and the nozzle layer includes a conductive epoxy resin including a metal to dissipate residual heat generated by the heater.

The method may further include forming an insulating layer between the substrate and the heater, forming a conductor on the heater to provide current to the heater, forming a passivation layer on the conductor and the heater, and forming a trench formed through the insulating layer, the conductor, and the passivation layer, and the forming a chamber layer may include forming the chamber layer to contact the substrate through the trench to dissipate residual heat generated by the heater towards the nozzle layer and/or towards the substrate.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
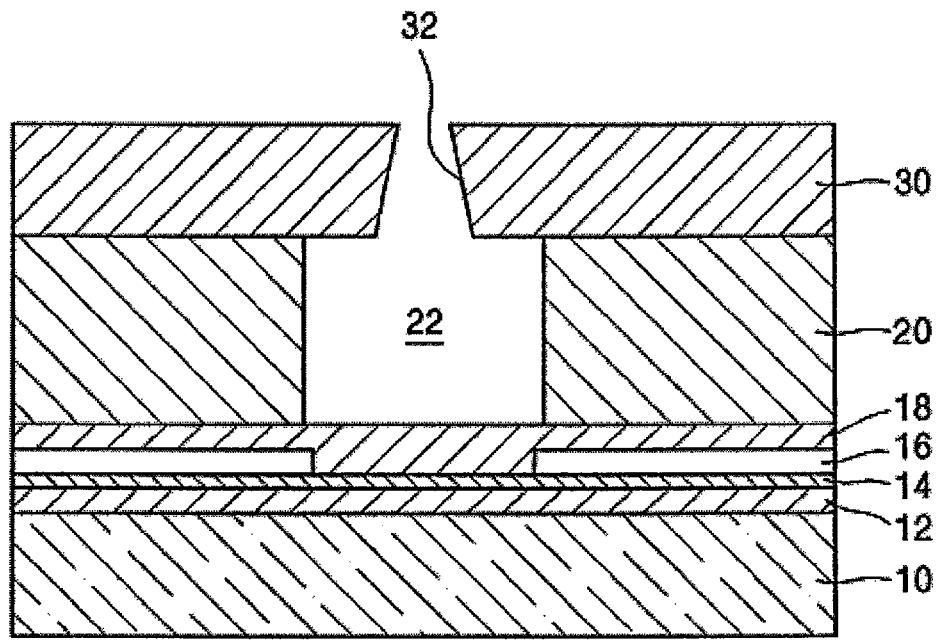
FIG. 1 is a schematic cross-sectional view illustrating a conventional thermal inkjet printhead.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. In the drawings, thicknesses of layers and regions may be exaggerated for clarity.

An inkjet printhead according to an embodiment of the present general inventive concept includes an ink flow path formed of a conductive epoxy resin and thus residual heat generated by a heater can be effectively dissipated, thereby enhancing ink ejection characteristics.

Figure 2:
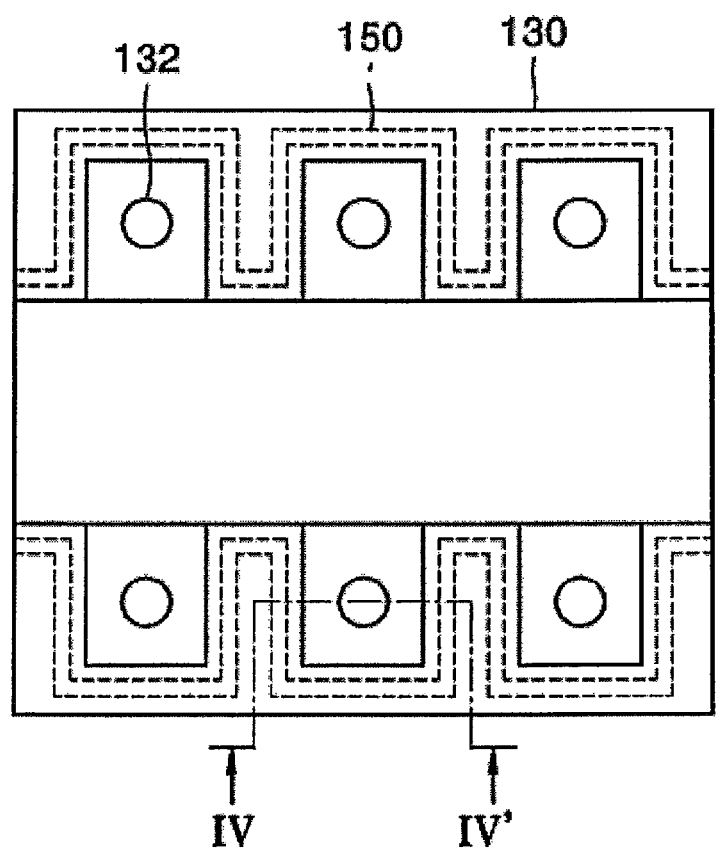
FIG. 2 is a plan view illustrating a nozzle portion of a thermal inkjet printhead, according to an embodiment of the present general inventive concept.
Figure 3:
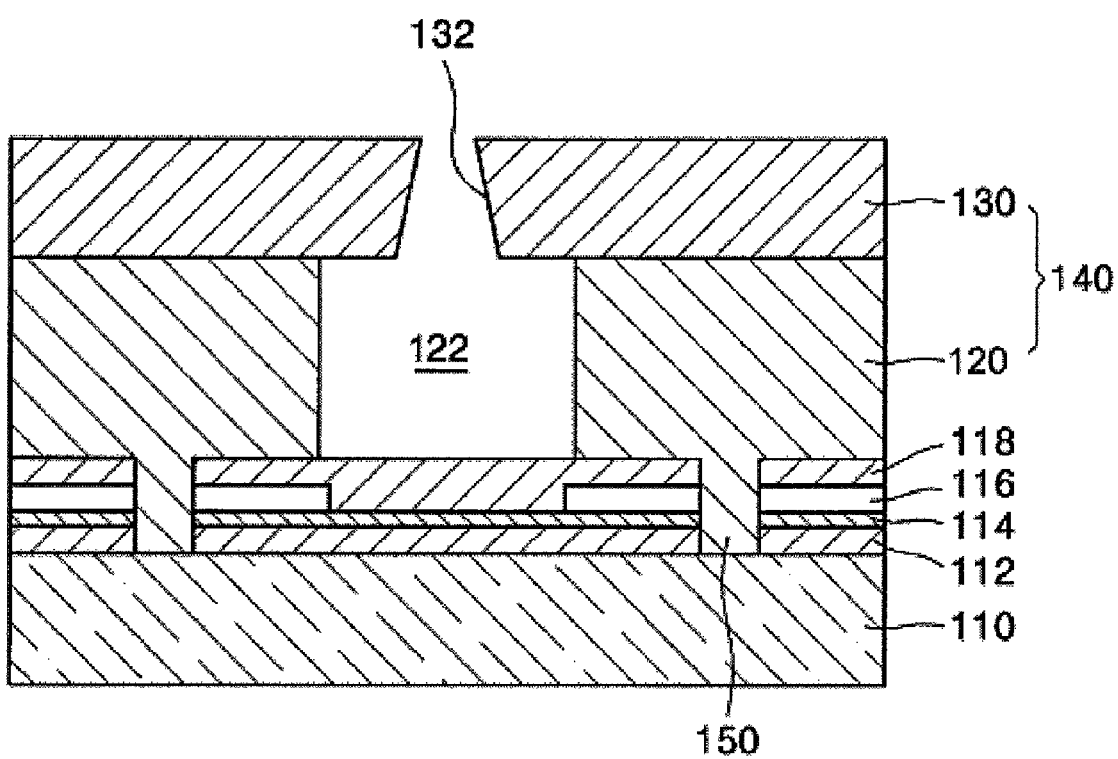
FIG. 3 is a cross-sectional view illustrating the nozzle portion of the thermal inkjet printhead illustrated in FIG. 2 taken along a line IV-IV', according to an embodiment of the present general inventive concept.

FIG. 2 is a plan view of a nozzle portion of a thermal inkjet printhead, according to an embodiment of the present general inventive concept. FIG. 3 is a cross-sectional view of the nozzle portion of the thermal inkjet printhead of FIG. 2 taken along a line IV-IV', according to an embodiment of the present general inventive concept.

The thermal inkjet printhead according to the present embodiment, which will be described hereinafter, can be applied not only to an inkjet printhead used in a shuttle type inkjet printhead but also in an array printhead used in a line printing type inkjet printer.

The terms "epoxy precursor polymer" and "epoxy resin" may not be not distinguished in the art. However, in the present embodiment, an epoxy polymer before being cross-linked by actinic radiation is referred to as "epoxy precursor polymer" and an epoxy polymer after being cross-linked by actinic radiation is referred to as "epoxy resin."

The inkjet printhead according to the present embodiment includes an ink flow path having a nozzle through which ink is ejected, and may be a hardening result of a conductive cross-linked polymer resist composition in which the ink flow path is formed by, for example, actinic radiation. The polymer resist composition may include: (a) at least one epoxy precursor polymer selected from a phenol novolak precursor polymer and an alicyclic precursor polymer including glycidyl ether group; (b) a metal alkoxide compound represented by the following Formula 1:

R'M(OR)$_n$ (Formula 1), where R' refers to a functional group including an oxirane group or an oxetanyl group, R refers to a C$_{1-10}$ alkyl group, and M is a metal selected from the group consisting of Al, Ti, and Zr; (c) a cationic photoinitiator; and (d) a solvent.

The at least one epoxy precursor polymer of the conductive cross-linked polymer resist composition may be at least one epoxy precursor polymer selected from a phenol novolak precursor polymer and an alicyclic precursor polymer including glycidyl ether group. The phenol novolak precursor polymer and alicyclic precursor polymer having a plurality of glycidyl ether functional groups form a thermosetting epoxy resin by radiating actinic radiation (e.g., UV radiation) to a solution in which a photoinitiator is present. The glycidyl ether polyfunctional group may be arranged in a hydrogen atom of a phenol hydroxyl group.

An epoxy precursor polymer having a bifunctional ether functional group will now be described with reference to the following formula:

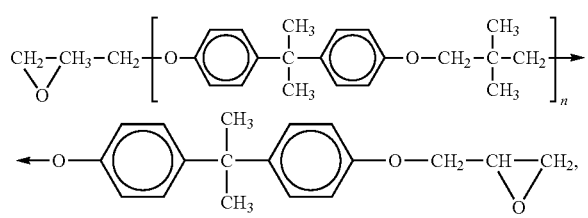

where n is an integer of 1 to 20.

The epoxy precursor polymer having the bifunctional ether functional group can form a film at a low cross-linking density. An amount of the epoxy precursor polymer having the bifunctional ether functional group may be about 5 to about 50% by weight of a total amount of the polymer resist composition to form the cross-linked polymer, such as about 10 to about 20% by weight.

Examples of the bifunctional precursor polymer include EPON 1004, EPON 1001F, and EPON 1010 available from Shell Chemical, DER-332, DER-331, and DER-164 available from Dow Chemical, and ERL-4201 and ERL-4289 available from Union Carbide, but are not limited thereto.

An epoxy precursor polymer having a polyfunctional ether functional group will now be described hereinafter.

The epoxy precursor polymer having the polyfunctional ether functional group can form a film at a high cross-linking density. Thus, a resolution increases and swelling of the ink or the solvent can be prevented. An amount of the polyfunctional epoxy precursor polymer may be about 0.5 to about 20% by weight of a total amount of the polymer resist composition, such as about 1 to about 5% by weight.

Examples of the polyfunctional epoxy precursor polymer include EPON DPS-164 and EPON SU-8 available from Shell Chemical, EPON DPS-164 and EPON SU-8 available from Dow Chemical, and EHPE-3150 available from Daicel Chemical, but are not limited thereto.

Examples of a skeleton monomer for the phenol novolak precursor polymer include phenol. The obtained glycidyl ether functional group novolak precursor polymer can be represented by the following Formula 2:

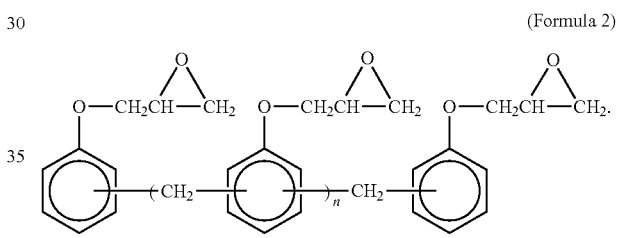

(Formula 2)

Also, examples of the skeleton monomer for phenol novolak precursor polymer include o-cresol and p-cresol having a branched structure of phenol. The obtained glycidyl ether functional group novolak precursor polymer can be represented by the following Formula 3 or Formula 4:

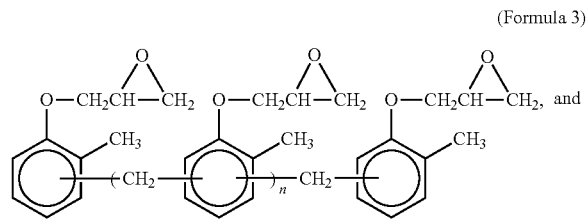

(Formula 3)

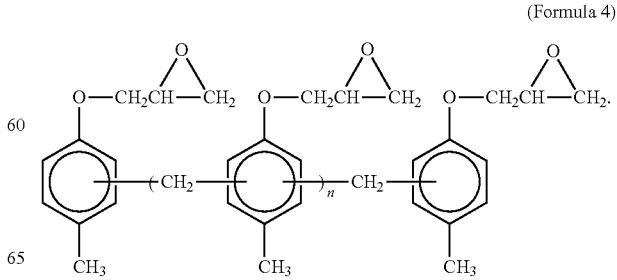

(Formula 4)

Also, examples of the skeleton monomer for phenol novolak precursor polymer include bisphenol A represented by the following Formula 5:

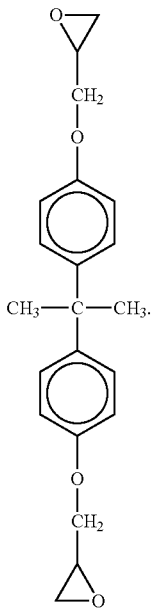

(Formula 5)

The obtained glycidyl ether functional group novolak precursor polymer can be represented by the following Formula 6 or Formula 7:

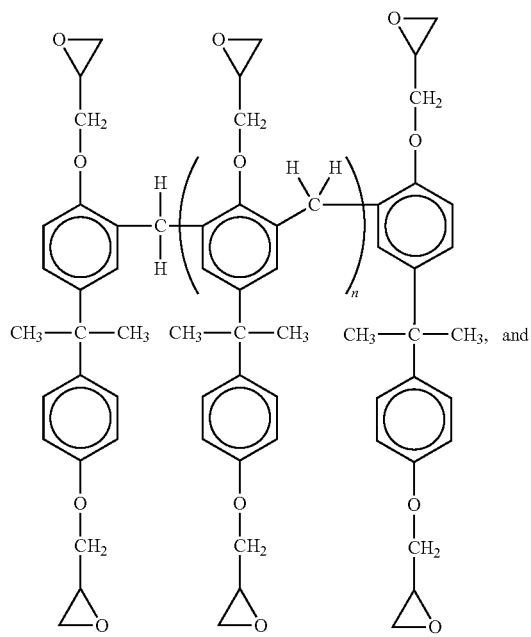

(Formula 6)

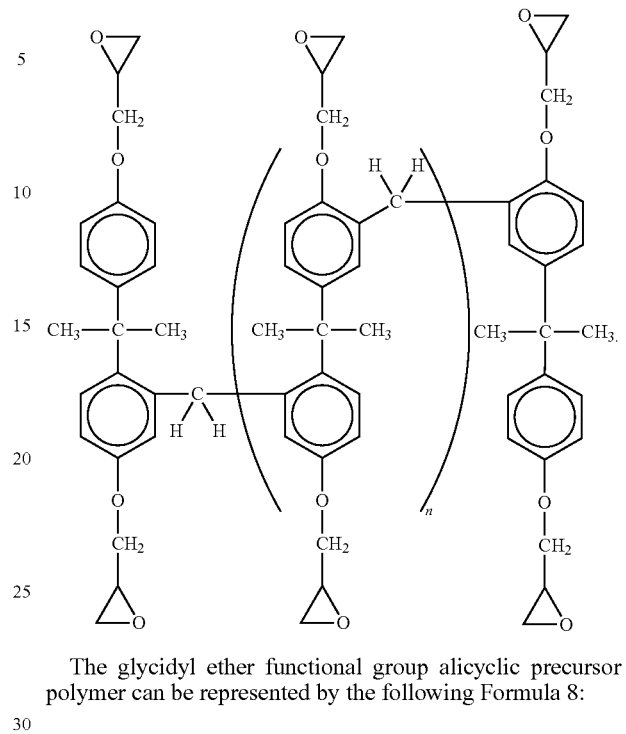

(Formula 7)

The glycidyl ether functional group alicyclic precursor polymer can be represented by the following Formula 8:

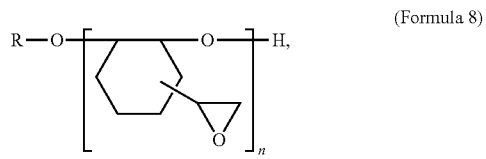

(Formula 8)

where n is an integer of 1 to 20, such as 1 to 10, and R refers to a $C_{1-10}$ alkyl group.

The metal alkoxide compound can be represented by the following Formula 1:

$$R'M(OR)_n \quad \text{(Formula 1)},$$

where R' refers to a functional group including an oxirane group or an oxetanyl group, R refers to a $C_{1-10}$ alkyl group, and M is a metal selected from the group consisting of Al, Ti, and Zr.

The metal alkoxide compound according to the present embodiment includes an epoxy ring in the compound molecule, unlike a conventional metal alkoxide compound. Thus, the metal alkoxide compound according to the present embodiment can effectively participate in a cross-linking reaction with an epoxy resin, unlike the conventional metal alkoxide compound.

A mechanism of the metal alkoxide compound forming a conductive epoxy resin according to an embodiment of the present general inventive concept will now be described with reference to Equations 1, 2, and 3. The description hereinafter is presented for the purpose of understanding the present general inventive concept and is not intended to limit the scope of the present general inventive concept. Equations 1, 2, and 3 are as follows:

$$R'M(OR)_n + nH_2O \text{ - - - } R'M(OH)_n + nROH \quad \text{(Equation 1)},$$

$$R'M(OH)_n + R'M(OH)_n \text{ - - - } R'M\text{-}[O]_n\text{-}MR' + nH_2O \quad \text{(Equation 2), and}$$

$$nR'M\text{-}[O]_n\text{-}MR' + mR'' + \text{photoinitiator} + UV \text{ - - - } R'M\text{-}[O]_n\text{-}MR'\text{---}R''\text{-}nR'M\text{-}[O]_n\text{-}MR'\text{---} \quad \text{(Equation 3).}$$

In Equations 1, 2, and 3, mR″ refers to an epoxy precursor polymer and R′ refers to a functional group including an oxirane group or an oxetanyl group. R″ refers to an alicyclic or aromatic epoxy resin, n is an integer of 1 to 20, m is 1 or an integer greater than 1, R refers to a $C_{1-10}$ alkyl group, and M is a metal selected from the group consisting of Al, Ti, and Zr.

In Equation 1, the metal alkoxide compound including an ether group reacts with a small amount of water and is converted into a metal hydroxyl compound including the ether group. Then, as represented in Equation 2, metal hydroxyl compounds including these ether groups are linked to each other by ether bonding. Next, as represented in Equation 3, these linked metal hydroxyl compounds are cross-linked (hardened) in the presence of the epoxy precursor polymer, the photoinitiator, and the actinic radiation, thereby forming a conductive epoxy resin including a metal.

The conductive epoxy resin formed in this manner has a structure where a metal is directly linked not only to a hydrogen atom but also to a carbon atom, thereby being stably bonded. Accordingly, the conductive epoxy resin can function as an effective conductive material.

Examples of the photoinitiator include an aromatic halonium salt and an onium salt of Groups VA and VI of the periodic table, for example, UVI-6974 available from Union Carbide or SP-172 available from Asahi denka.

Examples of the aromatic sulfonium salt include, but are not limited to, tetrafluoroborate triphenyl sulfonium, tetrafluoroborate methyl diphenyl sulfonium, hexafluoro phosphate dimethyl phenylsulfonium, hexafluoro phosphorous acid triphenyl sulfonium, hexafluoroantimonic acid triphenyl sulfonium (UVI-6974), and hexafluoroantimonic acid phenylmethyl benzyl sulfonium.

Examples of the aromatic iodide include tetrafluoroborate diphenyl iodinium, hexafluoroantimonic acid diphenyl iodinium, and hexafluoroantimonic acid butylphenyl iodonium (SP-172), but are not limited thereto.

Examples of the solvent include, but are not limited to, γ-butyrolactone, xylene, $C_{1-6}$ acetate, propylene glycol methyl ether acetate, tetrahydrofurane, methyl ethyl ketone, methyl butyl ketone, cyclopentanone, and mixtures thereof. An amount of the solvent may be about 20 to about 90% by weight based on a total amount of the cross-linked composition, such as about 45 to about 75% by weight.

Suitable additives of the cross-linked composition include, but are not limited to, a photo-sensitizer, a silane coupling agent, a filler, and a viscosity modifier.

The photo-sensitizer absorbs light energy and facilitates energy transfer to other compounds, and accordingly, a radical or ion initiator can be formed. The photo-sensitizer often extends a range of a wavelength of energy that is useful to exposure, and may be, for example, an aromatic light absorption chromophore. The photo-sensitizer may also induce a formation of a radical or ion photoinitiator.

An amount of the sensitizer may be about 0.1 to about 20% by weight based on a total weight of the cross-linked composition.

Referring to FIGS. 2 and 3, a substrate 110 may be formed of silicon. An insulating layer 112 is formed on the substrate 110 to provide insulation between the substrate 110 and a plurality of heaters 114. The insulating layer 112 may be formed of a silicon oxide ($SiO_x$). The heaters 114 are arranged in a predetermined formation on the insulating layer 112 to heat ink in ink chambers 122 to generate bubbles. Also, conductors 116 are formed on the heaters 114 to be electrically connected to the heaters 114 to apply current to the heater 114. Heating portions of the heaters 114, that is, portions of the heaters 14 that are exposed through the conductors 116, are disposed in a lower portion of each of the ink chambers 122. In addition, a passivation layer 118 is formed on a surface of the heaters 114 and the conductors 116. The passivation layer 118 can be formed of, for example, silicon nitride ($SiN_x$) or silicon oxide ($SiO_x$). In the present embodiment, the passivation layer 118 may be formed on the surface of the heaters 114 and the conductors 116.

Moreover, a trench 150 may be formed at a depth from a surface of the passivation layer 118 to a top surface of the substrate 110, along an outer circumference of the heaters 114. The width of the trench 150 is not limited, and may be as wide as possible. In addition, a conductive ink flow path 140 that is stacked on the substrate 110 where the passivation layer 118 is formed and fills the trench 150 is formed to dissipate heat generated from the heaters 114. The conductive ink flow path 140 may include a chamber layer 120, in which the ink chambers 112 are formed, and a nozzle layer 130, in which nozzles 132 are formed.

The conductive ink flow path 140 has conductivity and thus can dissipate heat easily and is connected to the substrate 110 through the trench 150, thereby functioning as a heat transfer layer which can dissipate heat toward the nozzle 132 and toward the substrate 110.

The conductive ink flow path 140 may be formed of any conductive material and is not limited. For example, conductive ink flow path 140 may be a hardening result formed by actinic radiation of a conductive cross-linked polymer resist composition including: (a) at least one epoxy precursor polymer selected from a phenol novolak precursor polymer and an alicyclic precursor polymer including glycidyl ether group; (b) a metal alkoxide compound represented by the following Formula 1:

where R′ refers to a functional group including an oxirane group or an oxetanyl group, R refers to a $C_{1-10}$ alkyl group, and M is a metal selected from the group consisting of Al, Ti, and Zr; (c) a cationic photoinitiator; and (d) a solvent.

EXAMPLE 1

Fabrication of Resist Composition 50 ml of Xylene (available from Samchun Chemical Co.) and 5 ml (3.45 wt %) of SP-172 (available from Asahi Eenka Korea Chemical Co.) were put in a container. Next, 90 g of EHPH-3150 epoxy resin (available from Daicel Chemical Co.) was added to the container. Then, 10 g of a metal alkoxide compound represented by the following formula was added and the solution in the container was agitated for 24 hours to form a resist composition of Example 1:

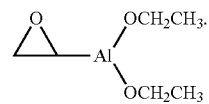

COMPARATIVE EXAMPLE 1

Fabrication of Comparative Resist Composition 50 ml of Xylene (available from Samchun Chemical Co.) and 10 ml of SP-172 (available from Asahi Eenka Korea Chemical Co.) were put in a container. Next, 90 g of EHPH-3150 epoxy resin (available from Daicel Chemical Co.) was added to the container and the solution in the container, in the absence of a metal alkoxide compound, was agitated for 24 hours to form a comparative resist composition of Comparative Example 1.

Resistances of ink flow paths fabricated using the resist composition of Example 1 and the comparative resist composition of Comparative Example 1, respectively, were measured. The measurements demonstrate that the resistance of the ink flow path formed of the resist composition of Example 1, including the metal alkoxide compounds according to an embodiment of the present general inventive concept, was lower than the resistance of the ink flow path formed of the comparative resist composition of Comparative Example 1, which did not include a metal alkoxide compound. Consequently, the measurements demonstrate that heat is dissipated more effectively when using the ink flow path formed of the resist composition of Example 1.

The inkjet printhead according to the present general inventive concept includes an ink flow path formed of a conductive epoxy resin and a trench formed around a heater of the inkjet printhead. Thus, residual heat generated from the heater can be effectively dissipated, thereby enhancing ink ejecting characteristics of the inkjet printhead.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An inkjet printhead, comprising:
   a substrate including a heater; and
   an ink flow path including a chamber layer stacked on the substrate and having an ink chamber surrounding the heater to contain ink, and a nozzle layer having a plurality of nozzles to eject ink from the ink chamber,
   wherein at least one of the chamber layer and the nozzle layer comprises a hardened polymer resist composition including a metal to dissipate residual heat generated by the heater, and
   wherein the hardened polymer resist composition is a conductive epoxy-based material comprising a cationically cross-linked reaction product of at least one epoxy precursor polymer and at least one of a metal alkoxide, a hydrolysis product of a metal alkoxide, and a condensation product of a metal alkoxide, wherein the metal alkoxide is represented by $R'M(OR)_n$, wherein:
   R' is a functional group including an oxirane group or an oxetanyl group, R is a $C_{1-10}$ alkyl group, and M is a metal selected from the group consisting of Al, Ti, and Zr.

2. The inkjet printhead of claim 1, wherein the polymer resist composition, prior to hardening, comprises:
   at least one epoxy precursor polymer selected from a phenol novolak precursor polymer including glycidyl ether groups and an alicyclic precursor polymer including glycidyl ether groups;
   at least one of a metal alkoxide, a hydrolysis product of a metal alkoxide, and a condensation product of a metal alkoxide, wherein the metal alkoxide is represented by $R'M(OR)_n$, wherein: R' is a functional group including an oxirane group or an oxetanyl group, R is a $C_{1-10}$ alkyl group, and M is a metal selected from the group consisting of Al, Ti, and Zr;
   a cationic photoinitiator; and
   a solvent.

3. The inkjet printhead of claim 2, wherein the at least one epoxy precursor polymer comprises a bifunctional ether functional group, and an amount of the at least one epoxy precursor polymer is about 5 to about 50% by weight based on a total amount of the polymer resist composition.

4. The inkjet printhead of claim 2, wherein the at least one epoxy precursor polymer comprises a bifunctional ether functional group, and an amount of the at least one epoxy precursor polymer is about 10 to about 20% by weight based on a total amount of the polymer resist composition.

5. The inkjet printhead of claim 2, wherein the at least one epoxy precursor polymer comprises a polyfunctional ether functional group, and an amount of the at least one epoxy precursor polymer is about 0.5 to about 20% by weight based on a total amount of the polymer resist composition.

6. The inkjet printhead of claim 2, wherein the at least one epoxy precursor polymer comprises a polyfunctional ether functional group, and an amount of the at least one epoxy precursor polymer is about 1 to about 5% by weight based on a total amount of the polymer resist composition.

7. The inkjet printhead of claim 2, wherein an amount of the solvent is about 20 to about 90% by weight based on a total amount of the polymer resist composition.

8. The inkjet printhead of claim 2, wherein an amount of the solvent is about 45 to about 75% by weight based on a total amount of the polymer resist composition.

9. The inkjet printhead of claim 2, wherein the polymer resist composition further comprises at least one member selected from the group consisting of a photo-sensitizer, a silane coupling agent, a filler, and a viscosity modifier.

10. The inkjet printhead of claim 9, wherein an amount of the photo-sensitizer is about 0.1 to about 20% by weight based on a total weight of the polymer resist composition.

11. The inkjet printhead of claim 1, wherein the inkjet printhead is a shuttle type inkjet printhead.

12. The inkjet printhead of claim 1, wherein the inkjet printhead is an array type inkjet printhead.

13. The inkjet printhead of claim 1, further comprising:
   an insulating layer formed between the substrate and the heater;
   a conductor formed on the heater to provide current to the heater;
   a passivation layer formed on the conductor and the heater; and
   a trench formed through the insulating layer, the conductor, and the passivation layer,
   wherein the chamber layer contacts the substrate through the trench to dissipate residual heat generated by the heater towards the nozzle layer and/or towards the substrate.

14. A method of manufacturing an inkjet printhead, the method comprising:
   forming a chamber layer having an ink chamber to contain ink on a substrate including a heater; and
   forming a nozzle layer having a plurality of nozzles to eject ink from the ink chamber,
   wherein at least one of the chamber layer and the nozzle layer comprises a hardened polymer resist composition including a metal to dissipate residual heat generated by the heater, and
   wherein the hardened polymer resist composition is a conductive epoxy-based material comprising a cationically cross-linked reaction product of at least one epoxy precursor polymer and at least one of a metal alkoxide, a hydrolysis product of a metal alkoxide, and a condensation product of a metal alkoxide, wherein the metal alkoxide is represented by $R'M(OR)_n$, wherein:

R' is a functional group including an oxirane group or an oxetanyl group, R is a $C_{1-10}$ alkyl group, and M is a metal selected from the group consisting of Al, Ti, and Zr.

15. The method of claim 14, further comprising:

forming an insulating layer between the substrate and the heater;

forming a conductor on the heater to provide current to the heater;

forming a passivation layer on the conductor and the heater; and forming a trench formed through the insulating layer, the conductor, and the passivation layer, wherein the forming a chamber layer comprises forming the chamber layer to contact the substrate through the trench to dissipate residual heat generated by the heater towards the nozzle layer and/or towards the substrate.

* * * * *